United States Patent [19]

Hager

[11] 3,713,963
[45] Jan. 30, 1973

[54] DRY MIXTURE OF COPPER SULFATE 8-HYDROXYQUINOLINE SULFATE, AND SULPHURIC ACID AS A PRESERVATIVE ADDITIVE TO A FIBROUS SLURRY PRIOR TO FORMING PAPER THEREFROM

[75] Inventor: Bror Olof Hager, Djursholm, Sweden

[73] Assignee: Hager Aktiebolag, Stockholm S.V., Sweden

[22] Filed: Nov. 27, 1970

[21] Appl. No.: 93,499

Related U.S. Application Data

[63] Continuation of Ser. No. 720,470, April 11, 1968, abandoned.

[52] U.S. Cl. ................162/161, 162/183, 424/245, 424/258
[51] Int. Cl. .........D21h 5/22, D21h 3/00, D21d 3/00
[58] Field of Search ......424/245, 258; 162/161, 183; 117/138.5

[56] References Cited

UNITED STATES PATENTS 2,381,863   8/1945   Benignus...........................117/138.5

FOREIGN PATENTS OR APPLICATIONS 636,925   12/1963   Belgium ................................162/161

OTHER PUBLICATIONS

Chemical Abstracts, Volume 62, 1965 (7996c)
Chemical Abstracts, Volume 62, 1965 (1840a)
"Copper Compounds" in Encyclopedia of Chemical Technology, Kirk and Othmer, Second Ed., Volume 6 (1965) 269.

Primary Examiner—S. Leon Bashore
Assistant Examiner—Richard H. Tushin
Attorney—Pierce, Scheffler & Parker

[57] ABSTRACT

Prior to formation of a paper web the fibrous suspension is treated with a water soluble dry mixture of 1) copper sulfate, 2) a reaction product of 8-hydroxyquinoline with a strong acid (e.g. 8-hydroxyquinoline sulfate), and 3) sulfuric acid (added as a reaction inhibitor for the undissolved components), to form water insoluble copper 8-hydroxyquinoline in situ on the fibers to help preserve the produced paper from destructive organisms. Other components may be useful as the dry mixture including copper sulfate and arsenic acid, with ammonium bicarbonate acting as the reaction inhibitor for the dry components.

6 Claims, No Drawings

DRY MIXTURE OF COPPER SULFATE 8-HYDROXYQUINOLINE SULFATE, AND SULPHURIC ACID AS A PRESERVATIVE ADDITIVE TO A FIBROUS SLURRY PRIOR TO FORMING PAPER THEREFROM

This application is a continuation of parent application Ser. No. 720,470, filed Apr. 11, 1968, and now abandoned.

The present invention relates to means for protecting fibrous organic materials, e.g., paper, board, etc. against destructive organisms such as fungi or insects.

The preservative is based on the copper radical which has been observed to have a very high preserving effect at the same time as it can be made extremely resistant to different kinds of influences. It can be precipitated in the material to be preserved so that it will not be leached out or converted under influence of moisture or air. Besides these properties it also has the advantage of being comparatively harmless to human beings and animals.

In order to increase the all-around conserving effect of the preservative, the copper radical-containing preservative is combined with other active ingredients for instance such which have a significant effect against mould, blue stain and/or insects. For obtaining this complementary effect, 8-hydroxyquinoline has been used. It has a high preserving effect and with copper it forms substantially insoluble compounds. Together with, or instead of, quinoline there sometimes has been used arsenic acid as additive ingredient, specially when a high protection against insects such as termites has been desired.

In order to utilize the good properties of the copper radical, the amount of copper in the preservative may be kept relatively high, i.e., higher than the amount corresponding to the formation of copperquinolate or -arsenate. Suitable proportions have been found to be about three times as much copper, calculated as metal, as the amount of quinoline and about double as much copper as arsenic acid, calculated as the pentoxide. By such copper surplus the advantage of a more safe and complete precipitation of the quinoline and/or arsenic acid is also obtained.

The preservative is made as a mixture of the different active (preserving) agents. When the preservative is used the different agents react with each other and form precipitations on the fibers of the material. This reaction may be prevented from taking place too early, e.g., in connection by the production or during the storing of the preservative. A too early reaction between the different active substances in the preservative must be avoided, because otherwise the consequence usually will be that the preservative when eventually used will have a poor retention on the paper pulp fibers. A stable preservative is obtained by keeping the mixture dry and by including in it some amounts of an acid substance — e.g., sulphuric acid — which counteracts the reaction. Alkaline substances, such as ammonia or sodium hydroxide, may sometimes be used instead of acid substances in order to retard (prevent) the reaction.

The preservative can in its simplest form be composed as a mixture of copper sulphate and a reaction product of 8-hydroxyquinoline with a strong acid, e.g. 8-hydroxyquinolinesulphate. These two substances are easy to dissolve, and it has been proved possible to mix them in dry state without having a reaction between them. In order to diminish the risk for such reaction in the mixture, and in order to facilitate the dissolution (in the aqueous suspension of pulp) of the material some sulphuric acid may be added. The preservative obtained in this way is a non-dusting powder, easy to use. For instance, it can be given the following composition (stated in parts by weight):

Copper sulphate, crystallized, 85 parts,
8-hydroxyquinolinesulphate, 10 parts, and
Sulphuric acid, 65 per cent, 5 parts.

If arsenic acid is included in the preservative, the preservative may for example be given the following composition:

Copper sulphate, crystallized, 60 parts,
Copper sulphate, water-free, 10 parts,
8-hydroxyquinolinesulphate, 10 parts,
Monosodium arsenate, crystallized, 15 parts, and
Sulphuric acid, 65 per cent, 5 parts.

In this latter composition some water-free copper sulphate has been used in the mixture for the reason that the powder hereby acquires a more suitable form for its handling.

In the manufacture of the fiber product — for instance paper — the easily dissoluble preservative is introduced into the paper raw material. As a rule, it is added to the mixture of paper pulp and water in the pulp engine. The amount of paper pulp here usually is about 3 per cent. The amount of preservative that ought to be added to the paper pulp depends on the effect of the preservation wanted and on the particular paper pulp being treated, different pulps having different retentions. The amount of preservative added varies normally between 0.5 and 3.0 per cent by weight based on the dry weight of the pulp. By the addition of the preservative to the pulp-water mixture the different compounds in the preservative are dissolved but in the moment of dissolution they form a voluminous precipitation which is deposited on the fibers. In order to obtain best retention, the acidity of the pulp-preservative-water mixture has to be adjusted to a suitable value between pH 6.2 and 7.0. Retentions around 70 per cent of theoretical are obtained with proper handling and suitable pulp. Good results have been obtained with unbleached sulphate pulp. The retention is favored when the pulp has a high chlorine value,— that is, when it also contains some lignin, resin and similar substances in addition to the cellulose fibers per se.

The proportions of the ingredients of the preserving composition can be varied if wanted or necessary. Other active metals than copper can be used in the preservative, for instance zinc, nickel, cadmium, etc., but — as said above — the copper radical is as a rule the most suitable. Metals such as aluminum and/or chromium can be introduced in the preservative in the form of soluble salts in order to serve as an additional fixing agent, particularly where arsenic acid is the substance to be fixed.

The preserving metal radical can be combined with some other active compound than quinoline or arsenic acid. Among operable organic compounds there can be used fatty acids, chlorinated products etc. As a rule these are not as suitable as quinoline. Most of these compounds have to be stabilized with alkaline materials, and not with acidic ingredients. Several negative inorganic compounds other than arsenic acid and having good preserving effect are known. As examples there may be mentioned fluorine and boron. Unfortunately these and many others cannot be effectively fixed on the fibers. Therefore it is hard to propose other than arsenic acid or arsenious acid. The arsenious acid is, however, more dangerous to handle than the arsenic acid and has a tendency to dust. Furthermore, the copper salts with it — the arsenites — are not as stable as are the copper arsenates. The arsenic acid is preferred. Arsenic acid is, however, very hydroscopic: this is the reason why it ought to be used in the form of an alkali salt, but the alkali amount has to be low otherwise there is a risk that a chemical reaction will take place between the copper compound and the arsenate.

If the preservative — e.g., a composition containing copper sulphate, arsenic acid but no quinoline - has to be stabilized with an alkaline compound the same can also be done in a special way when using a large amount of ammonia or an ammoniacal compound. According to this embodiment, a preservative can for instance be made of 100 parts crystallized copper sulphate, 12 parts of arsenic acid calculated as pentoxide and 150 to 200 parts ammoniumbicarbonate, the recited "parts" being parts by weight. Some carbon dioxide is driven off from the mixture and a solid permanent product is obtained.

Instead of copper sulphate, the copper amount wanted in the preservative may be introduced in the form of some other copper compound, such as copper carbonate, hydroxide, suboxide, etc. The latter compounds do not give neutral salts — as ammonium sulphate — when the preservative is used. When treating paper and board, however, the question as to the relative solubility of the salts is not an important problem: so much water is usually mixed with the pulp that the pulp itself never will absorb much of the soluble salts.

Waste from plants using preservatives according to the invention can be cleaned (a) by a filtration after an addition of alkali, or (b) by a filtration through slaked lime. Residues of the preservatives may even be removed (c), by passing the waste through finely divided iron.

I claim:

1. A preservative for the treatment of paper, paper board, paper pulp and other fibrous materials, consisting essentially in a water-soluble mixture of (a) copper sulphate, (b) a reaction product of 8-hydroxyquinoline with a strong acid and (c) an acid, the relative mounts of copper to the quinoline compound being from a stoichiometric amount corresponding to the formation of copper 8-hydroxyquinoline to about three times more copper than quinoline, and the amount of acid being sufficient to counteract premature reaction, which mixture when added to an aqueous suspension of the fibrous material yields difficulty-soluble preservative precipitates in situ in the fibers.

2. A preservative according to claim 1, consisting essentially of a mixture of copper sulphate, 8-hydroxyquinoline sulphate and sulphuric acid.

3. A preservative according to claim 2 in which the 8-hydroxyquinoline sulphate and sulphuric acid are present in proportions 10 parts by weight of 8-hydroxyquinoline sulphate and 5 parts by weight of sulphuric acid (65 percent solution).

4. A preservative according to claim 2, comprising a mixture of about 85 parts by weight of copper sulphate, 10 parts by weight of 8-hydroxyquinoline sulphate and 5 parts by weight of sulphuric acid (65 percent solution).

5. Process of protecting fibrous organic materials including paper, paper board and paper pulp from destructive organisms including fungi and insects, which consists essentially in forming an aqueous suspension of fibrous organic material to be protected, homogeneously dispersing in said suspension a mixture consisting essentially of copper sulphate and 8-hydroxyquinoline sulphate and sulphuric acid as defined in claim 4, in an effective amount up to 3 percent by weight based on the dry weight of the organic fibrous material in said suspension, adjusting the pH-value of the suspension if necessary to between 6.2 and 7.0 whereby the components of said mixture react in the aqueous medium to form a precipitate in situ in and on the fibers, and thereafter substantially dewatering the so-treated suspension.

6. Process of protecting fibrous organic materials including paper, paper board and paper pulp from destructive organisms including fungi and insects, which consists essentially in forming an aqueous suspension of fibrous organic material to be protected, homogeneously dispersing in said suspension a mixture consisting essentially of copper sulphate and 8-hydroxyquinoline sulphate and sulphuric acid as defined in claim 1, in an effective amount up to 3 percent by weight based on the dry weight of the organic fibrous material in said suspension, adjusting the pH-value of the suspension if necessary to between 6.2 and 7.0 whereby the components of said mixture react in the aqueous medium to form a precipitate in situ in and on the fibers, and thereafter substantially dewatering the so-treated suspension.

* * * * *